Patented Apr. 12, 1932

1,853,771

UNITED STATES PATENT OFFICE

ALFRED T. LARSON, OF WILMINGTON, DELAWARE, ASSIGNOR TO E. I. DU PONT DE NEMOURS & COMPANY, OF WILMINGTON, DELAWARE, A CORPORATION OF DELAWARE

CATALYTIC MATERIAL AND PROCESS OF PRODUCING SAME

No Drawing.     Application filed January 30, 1928.   Serial No. 250,737.

This invention relates to catalytic materials and particularly to a new form of catalyst and a method of preparing the same.

Oxides and compounds thereof are employed as catalyst in many chemical processes as, for example, in the synthesis of hydrocarbons and alcohols from oxides of carbon and hydrogen, the synthesis of ammonia, the conversion of steam and carbon monoxide to hydrogen, etc. The problem of preparing catalysts for use in such reactions as these involves many practical difficulties because it is desired, insofar as possible, to combine in the catalysts the qualities of high activity, mechanical strength and cheapness. From the standpoint of physical ruggedness the most satisfactory catalysts are doubtless those prepared by melting the ingredients, and breaking the cooled melt into particles of suitable size. This type of catalyst is relatively expensive, however, because of its high density and the consequent larger consumption of the materials in manufacturing catalysts for a reaction space of given dimensions. Moreover, there are certain materials that are not well adapted for treatment in this way as, for example, such refractory oxides as aluminum oxide and manganese oxide, and others like chromium oxide that may suffer loss in catalytic activity on exposure to the temperatures necessary for fusion.

Catalysts may also be prepared by forming the more or less finely divided material into briquets or pellets, for example, in an apparatus of the type employed in the manufacture of pharmaceutical tablets. One of the principal obstacles to the wider application of this method has been the inability to form satisfactorily rugged briquets with many materials unless some sort of binder is used. Such catalysts as can be prepared with the binders hitherto proposed leave much to be desired particularly in the way of mechanical strength.

It is the object of the present invention to provide a new and improved method of preparing briquetted catalysts from oxides or compounds thereof.

It is a further object of the invention to provide a new and improved form of briquetted catalysts.

Other objects and advantages of the invention will be apparent as it is better understood by reference to the following specification in which its details and preferred embodiments are described.

According to the invention I prepare briquetted catalysts of superior quality by employing a metal as a binding material. That is, I first prepare an intimate mixture of the catalytic material and a suitable metal and then subject the mixture to pressure, (for example, in a tableting machine), sufficient to deform the crystals of the metal and make a coherent mass of catalyst material and metal. Catalysts prepared in this manner are characterized by a high degree of mechanical strength and are, generally speaking, of a superior order of activity, particularly since they do not suffer from the presence of deleterious substances hitherto used as binding agents in forming briquetted catalysts. In fact, the catalysts combine to a large extent the principal advantages of briquetted catalysts and fused catalysts as well.

The invention is not restricted to the use of any particular metal as binding material although, other things being equal, the metal should preferably be a relatively plastic one. For the sake of illustration I mention the metals copper, lead, silver, gold, platinum, aluminum, tin, iron and zinc as being generally suitable. Naturally, in selecting the binder for a catalyst to be used in any particular reaction, consideration should be given to the known catalytic properties or that metal with respect to the reaction in question.

It is not to be inferred from the foregoing that the metal selected as binding agent may not, if desired, be one possessing some catalytic activity with respect to the reaction in which the finished product is to be employed. In fact, it is often advantageous to choose a metal which is a catalyst per se or which is of such a character as to constitute a support or promoter for the catalytic material with which it is associated in the final product.

The metal used may even in some cases be the metal corresponding to the compound which forms the basis of the catalyst. Thus an iron oxide catalyst useful for many purposes may be prepared by compressing a mixture of iron oxide and finely divided metallic iron.

Although the simplest manner of carrying out the invention is to intimately mix relatively finely divided catalyst material and a metal and then compress the mixture into masses, which may be broken up subsequently, or into pellets, I have found that it is particularly advantageous to prepare the intimate mixture of the catalyst material and metal by first forming a comparatively homogeneous mixture of catalyst material and a compound of the binding metal readily reducible to the metallic state. Thus, for example, I may prepare by coprecipitation an intimate mixture of a catalytic oxide and an oxide of the metal that is to serve as binding agent. This material is then subjected to reduction as, for instance, by heating in a current of hydrogen, and the product, consisting of catalytic oxide intimately associated with particles of metallic binding agent, is then compressed to form it into coherent particles of the desired size and shape. Instead of precipitating the binding agent in the form of the oxide other compounds may, if desired, be formed,—as, for instance, the formate, oxalate, etc.—which are readily reduced to the free metal.

Catalysts of complex composition may also be prepared by the method of the invention, as, for instance, by briquetting a mixture of two or more oxides or other compounds with a metallic binder. Also, if it is desired, the binding agent may consist of two or more metals employed in the form of an intimate mixture of the powdered metals, or finely divided alloys thereof, or obtained, for example, by coprecipitation of the catalytic oxide or oxides and compounds of the binding metals which are reduced to the metallic state for briquetting.

Although the invention is susceptible of wide variation in the manner of its application to the practical preparation of catalytic materials, I will now describe by way of illustration a number of examples of catalysts and methods of preparing the same in conformity with the general principles of the invention.

*Example 1.*—Mix intimately 95 parts by weight of precipitated iron oxide with 5 parts of powdered aluminum. Form the mixture into pellets by compression in a tableting machine, using a pressure sufficient to deform the particles of metallic aluminum and yield a tough, coherent material. This catalyst may be used for the synthesis of ammonia from nitrogen and hydrogen as well as for the manufacture of methane and other hydrocarbons from hydrogen and carbon monoxide.

*Example 2.*—Add a dilute solution of ammonia to a dilute solution containing 10 gram moles of aluminum nitrate and 90 gram moles of ferric nitrate. After the oxides have been completely precipitated, wash by decantation until free from dissolved salts. Filter and then dry the oxide mixture. Treat the dried oxide mixture in a current of hydrogen at a low temperature, for example, 350–550° C., until the iron oxide has been largely reduced to iron. The reduced material is now cooled and briquetted as in Example 1. The briquetting operation is preferably carried out in an atmosphere free from oxygen. This catalyst may be advantageously employed in reactions requiring a very active hydrogenating or dehydrogenating agent, as, for example, the hydrogenation of carbon monoxide or carbon dioxide to form methane. It may also be used in the synthesis of ammonia.

*Example 3.*—90 parts by weight of zinc oxide, which has been prepared by ignition of zinc powder, is intimately mixed with 10 parts by weight of brass powder, (for example, a brass consisting of 80% copper and 20% zinc). This mixture is briquetted in a hydraulic press. The compressed cake is then broken into fragments of suitable size. This catalyst may be used in certain hydrogenation and dehydrogenation reactions, as, for example, the partial hydrogenation of carbon monoxide under pressure to give methanol.

*Example 4.*—95% by weight of precipitated iron oxide is intimately mixed with 4% by weight of chromium oxide and 1% by weight of cerium oxide. The mixture is reduced in an atmosphere of hydrogen, preferably within the temperature interval 300–500° C. When the reduction of the iron oxide is practically complete, the mixture is cooled to room temperature and briquetted out of contact with air. This catalyst may be employed in the synthesis of methane from carbon monoxide and hydrogen, or in the oxidation of carbon monoxide by steam to yield carbon dioxide and hydrogen.

*Example 5.*—One gram mole of copper oxalate is mixed with two gram moles of manganese chromate. The mixture is reduced at a low temperature in hydrogen, preferably within the temperature interval 150–350° C. After cooling the mixture to room temperature it is compressed into pellets in a suitable briquetting machine. This catalyst material may be employed in certain hydrogenation reactions, such as the synthesis of methanol from carbon monoxide and hydrogen, or in the conversion of carbon monoxide and steam into hydrogen and carbon dioxide.

In the event that the metal employed as binding agent is one readily susceptible of oxidation on exposure to air, it may be necessary for the best results to carry on a part or all of the process in the presence of a reducing, or at least an inert, atmosphere. Thus, for example, if metallic copper is mixed with a catalytic oxide in an ordinary mixing mill superficial oxidation of the metal may occur to such an extent as to make it desirable to subject the material to reduction before it is briquetted and to carry on the briquetting operation in an atmosphere of carbon dioxide. Similarly if the intimate mixture of metal and oxide has been prepared by the coprecipitation of the oxide and a reducible compound of the metal followed by reduction of the latter, precautions for the exclusion of air may advantageously be taken before and during the briquetting operation.

As hereinbefore indicated, the process is applicable to the preparation of catalysts of complex composition; i. e. so-called promoted or mixed catalysts containing two or more elements in addition to the binding agent. In some cases of this kind it may be desired to have the catalytically active ingredients associated with each other in the form of a chemical compound. Thus, for example, compounds such as zinc chromate, nickel borate, manganese chromate, etc. have been proposed as better catalysts for certain purposes than mere mixtures of the respective oxides. In accordance with the invention catalysts of this general type may also be prepared using a metal as binding material.

Various changes may be made in the method described without departing from the invention or sacrificing any of the advantages thereof.

I claim:

1. The process of forming a contact body by compressing a non-metallic catalyst into coherent masses wherein a plastic metal is used as a binding agent.

2. A contact body comprising particles of non-metallic catalyst material bound together with mechanically deformed particles of plastic metal.

3. The process of forming a contact body by compressing a catalytic oxide into coherent masses wherein a plastic metal is used as a binding agent.

4. A contact body comprising particles of catalytic oxide bound together with mechanically deformed particles of plastic metal.

5. The process of forming a contact body by compressing a catalytic oxide of a metal into pellets, wherein copper is used as a binding agent.

6. The process of manufacturing an oxide catalyst which comprises preparing an intimate mixture of a catalytic metal oxide and copper and compressing the same into a coherent mass.

7. The process of manufacturing an oxide catalyst which comprises forming a precipitate containing a catalytic metal oxide together with a reducible compound of copper, subjecting the product to reduction to form an intimate mixture of said oxide and said copper and thereafter compressing the product into a coherent mass.

8. A contact body comprising particles of catalytic metal oxide bound together with mechanically deformed particles of copper.

In testimony whereof I affix my signature.

ALFRED T. LARSON.